(12) United States Patent
Inoue et al.

(10) Patent No.: US 7,245,578 B2
(45) Date of Patent: *Jul. 17, 2007

(54) OPTICAL RECORDING MEDIUM (75) Inventors: Hiroyasu Inoue, Chuo-ku (JP); Hideki Hirata, Chuo-ku (JP)

(73) Assignee: TDK Corporation, Tokyo (JP)

( * ) Notice: Subject to any disclaimer, the term of this patent is extended or adjusted under 35 U.S.C. 154(b) by 641 days.

This patent is subject to a terminal disclaimer.

(21) Appl. No.: 10/485,663

(22) PCT Filed: Sep. 24, 2002

(86) PCT No.: PCT/JP02/09798

§ 371 (c)(1),
(2), (4) Date: Feb. 3, 2004

(87) PCT Pub. No.: WO03/028022

PCT Pub. Date: Apr. 3, 2003

(65) Prior Publication Data
US 2004/0170115 A1    Sep. 2, 2004

(30) Foreign Application Priority Data

Sep. 26, 2001  (JP) ............................. 2001-292774
Sep. 26, 2001  (JP) ............................. 2001-294164

(51) Int. Cl.
*G11B 7/24* (2006.01)
(52) U.S. Cl. ............................................. 369/275.4
(58) Field of Classification Search ............. 369/59.11, 369/275.4, 13.38, 275.2, 288, 283, 275.3, 369/275.1; 428/332, 336
See application file for complete search history.

(56) References Cited

U.S. PATENT DOCUMENTS 4,189,735 A    2/1980    Bell et al.

(Continued)

FOREIGN PATENT DOCUMENTS

JP    A 54-126005    9/1979

(Continued)

OTHER PUBLICATIONS

Kubogata et al., "Phase change optical disks with low cross-erase," Proceedings of 11th Symposium on Phase Change Optical information storage, pp. 78-82, Nov. 25-26, 1999.

*Primary Examiner*—Ali Neyzari
(74) *Attorney, Agent, or Firm*—Oliff & Berridge, PLC (57) ABSTRACT

An optical recording medium is provided, which has reduced degradation in jitter caused by manufacturing variations of a semiconductor laser emitting laser beams or variations in output power of laser beams, and which dissipates heat in the recording layer during recording by laser beams to increase the power margin of the laser beam providing playback jitter values at a certain level or less. An optical recording medium 10 has a support substrate 12, on which formed are a reflective film 16, a second dielectric layer 18, a recording layer 20, a first dielectric layer 22, a heat sink layer 24, and a light-transmitting layer 26. The heat sink layer 24 is formed of a material having a thermal conductivity within a certain range, e.g., alumina, to dissipate heat through the heat sink layer 24 when the heat is generated by a laser beam incident from the light-transmitting layer 26, thereby preventing an increase in temperature of the recording layer 20.

23 Claims, 8 Drawing Sheets

U.S. PATENT DOCUMENTS

| | | | |
|---|---|---|---|
| 5,656,370 A * | 8/1997 | Murakami et al. | 428/332 |
| 6,177,167 B1 * | 1/2001 | Yuzurihara et al. | 428/64.1 |
| 6,709,801 B2 * | 3/2004 | Miyamoto et al. | 430/270.13 |
| 6,888,781 B2 * | 5/2005 | Nishino et al. | 369/13.04 |
| 2002/0021643 A1 * | 2/2002 | Miura et al. | 369/59.11 |

FOREIGN PATENT DOCUMENTS

| | | |
|---|---|---|
| JP | A 60-264293 | 12/1985 |
| JP | A 09-223332 | 8/1997 |
| JP | A 11-238253 | 8/1999 |
| JP | A 11-328732 | 11/1999 |
| JP | A 2001-028148 | 1/2001 |
| JP | A 2001-229539 | 8/2001 |

\* cited by examiner

OPTICAL RECORDING MEDIUM

This application is a 371 of PCT/JP02/09798 Sep. 24, 2002

TECHNICAL FIELD

The present invention relates to an optical recording medium, and more particularly to an optical recording medium which provides a wide power margin.

BACKGROUND ART

As conventional recording media for recording digital data, optical recording media (discs) represented by CDs (Compact Discs) and DVDs (Digital Versatile Discs) have been widely used. The optical recording media have widely employed a method of recording data in which data to be recorded is modulated into a length of recording marks along tracks. Additionally, these optical recording media are fabricated such that their various asfabricated (initial) characteristics (electrical and mechanical properties) comply with predetermined specifications, and in particular, their playback jitter values are required to be equal to or less than a certain value as a fundamental property.

One of the factors responsible for variations in playback jitter value is a variation in the power of a laser beam during recording operations.

An insufficient amount of power of the laser beam being supplied during recording operations would not accurately form marks of predetermined lengths, thereby causing an increase in playback jitter value. On the other hand, an excessive amount of power of the laser beam would cause an increase in jitter value due to deformation or the like in recording marks.

This will be explained below in more detail. To read data when the aforementioned recording method is employed, an optical recording medium is irradiated with a laser beam along the tacks to detect the reflected light, thereby reading information carried by the recording marks. On the other hand, to record data, the optical recording medium is irradiated with a laser beam along the tracks to form recording marks having a predetermined length. For example, DVD-RWs (Rewritable) or a type of the user data-rewritable optical recording medium employ recording marks having lengths corresponding to 3T to 11T and 14T (where T is one clock cycle), thereby recording data.

In general, when data is recorded on an optical recording medium, the optical recording medium is not irradiated with a laser beam that has the same pulse width as the duration corresponding to the length of a recording mark to be formed but with a laser beam of a train of the number of pulses determined in accordance with the type of the recording mark to be formed, thereby forming recording marks having a predetermined length. For example, to record data on the aforementioned DVD-RW, pulses as many as n–1 or n–2 (where n indicates the type of recording marks and takes on any one of 3 to 11 and 14) are successively impinged thereon, thereby forming any one of the recording marks having lengths corresponding to 3T to 11T and 14T. Accordingly, for n–2, to form a recording mark having a length corresponding to 3T, one pulse is used, while to form a recording mark having a length corresponding to 11T, nine pulses are used. Furthermore, for n–1, to form a recording mark having a length corresponding to 3T, two pulses are used, while to form a recording mark having a length corresponding to 11T, ten pulses are used.

To form such recording marks, it is necessary to set the laser beam to appropriate recording power for each target optical recording medium. However, the recording power provided by a laser beam may be greatly different from a desired level due to manufacturing variations of the semiconductor laser emitting the laser beam, or may be out of an appropriate range due to variations caused by its service environments or the like. In these cases, recording marks cannot be formed in an appropriate shape, resulting in jitter value being significantly degraded.

That is, although a countermeasure of controlling the radiation power provided by a laser beam within the range of predetermined levels has been taken, a problem still exists in practice that variations resulting from the manufacturing of the semiconductor laser employed or variations in its output power as well as its service environments may cause an excessive output power of a laser beam during operation, thus resulting in an increase in playback jitter value.

On the other hand, in recent years, there is an increasing demand for further improved data transfer rates of the optical recording medium. To meet this demand, the linear speed of recording/reproduction operations can be effectively increased, for which it is necessary to increase clock frequencies. However, since the laser driver for driving the semiconductor laser is limited in its operating speed, shortening one clock cycle (T) by increasing the clock frequency would raise a phenomenon that the pulses of the laser beam are limited in amplitude, thereby causing the next pulse to arrive before the power of the laser beam has been lowered to a sufficient level. Such a phenomenon would provide the same condition as setting the laser beam to a higher recording power, thereby resulting in significant degradation in jitter value.

In this context, it is desirable to form recording marks in an appropriate shape even in the aforementioned cases to provide good jitter.

The present invention was developed in view of the aforementioned conventional problems. It is therefore an object of the present invention to provide an optical recording medium which can minimize an increase in playback jitter value even in the presence of considerable variations in the power of a laser beam employed, caused by variations resulting from the manufacturing of a semiconductor laser emitting the laser beam or variations in output power of the laser beam.

It is also another object of the present invention to provide an optical recording medium which has reduced degradation in jitter when data is recorded at high data transfer rates.

DISCLOSURE OF THE INVENTION

As a result of intensive studies, the inventor found that degradation in jitter value could be prevented by making the relation between the upper and lower limits of the recording power provided by a laser beam within a certain range. Also found was the fact that a heat sink layer provided on the side of a recording layer upon which laser beams were incident would dissipate heat that was generated in the recording layer during irradiation with the laser beam, thereby minimizing an increase in playback jitter value even in the presence of significant variations in the power of the laser beam.

That is, the aforementioned objects are achieved by the following inventions:

(1) An optical recording medium, having at least a light-transmitting layer covered with a recording layer formed on a support substrate, for recording information on the recording layer by a laser beam incident from the light-transmitting layer. The optical recording medium is characterized in that the recording layer is provided with a heat sink layer on its light-transmitting layer side, the heat sink layer being made of a material having a thermal conductivity of greater than 1 $W \cdot m^{-1} \cdot K^{-1}$.

(2) The optical recording medium according to (1), wherein the heat sink layer is set so that Pmax>Pmin×2.2, where Pmax and Pmin are the maximum and minimum limit powers of a laser beam having a wavelength of 450 nm or less, respectively, at which a playback jitter value is less than 13% when reproducing information that has been recorded onto the recording layer by being irradiated with the laser beam via a radiation optical system with an objective lens having a numerical aperture of 0.7 or more.

(3) The optical recording medium according to (2), wherein the laser beam has a wavelength of 380 nm or more.

(4) The optical recording medium according to (1), (2), or (3), wherein the heat sink layer has a thickness of 10 nm or more and 200 nm or less, preferably 30 nm or more and 100 nm or less.

As used herein, the term "jitter" refers to the clock jitter having a value that is determined as in σ/Tw (%), where σ is the signal fluctuation obtained by measuring a playback signal with a time interval analyzer and Tw is the detection window width.

(5) An optical recording medium, having at least a recording layer, for recording information by forming a recording mark on the recording layer with a laser beam, wherein a condition of Pw(max1)/Pw(min1)>2.2 is satisfied, where Pw(min1) is a lower limit of recording power provided by the laser beam when a jitter value of the recording mark formed is less than 13%, and Pw(max1) is an upper limit of recording power provided by the laser beam when the jitter value of the recording mark formed is less than 13%.

The invention according to (5) provides a wide recording power margin for effectively reducing the occurrence of read error. This makes it possible to reduce the jitter value even when the recording laser beam provides power at a level significantly different from a desired one due to manufacturing variations of the semiconductor laser emitting the laser beam, or even when the power of the laser beam is greatly varied due to variations of its service environments or the like. This makes it possible to record data with stability.

(6) The optical recording medium according to (5), wherein a condition of Pw(max1)/Pw(min1)>2.5 is satisfied.

The invention according to (6) provides a wider recording power margin for effectively reducing the occurrence of read error, thereby making it possible to record data with improved stability.

(7) The optical recording medium according to (5), wherein a condition of Pw(max1)/Pw(min1)>3 is satisfied.

The invention according to (7) provides a much wider recording power margin for effectively reducing the occurrence of read error, thereby making it possible to record data with more improved stability.

(8) The optical recording medium according to any one of (5) to (7), wherein a condition of Pw(max2)/Pw(min2)>1.5 is satisfied, where Pw(min2) is a lower limit of recording power provided by the laser beam when the jitter value of the recording mark formed is less than 9%, and Pw(max2) is an upper limit of recording power provided by the laser beam when the jitter value of the recording mark formed is less than 9%.

The invention according to (8) provides a wide recording power margin for more effectively reducing the occurrence of read error, thereby making it possible to record data with stability.

(9) The optical recording medium according to (8), wherein a condition of Pw(max2)/Pw(min2)>1.8 is satisfied.

The invention according to (9) provides a wider recording power margin for more effectively reducing the occurrence of read error, thereby making it possible to record data with improved stability.

(10) The optical recording medium according to (9), wherein a condition of Pw(max2)/Pw(min2)>2 is satisfied.

The invention according to (10) provides a much wider recording power margin for more effectively reducing the occurrence of read error, thereby making it possible to record data with much improved stability.

(11) The optical recording medium according to any one of (5) to (10), further including a light-transmitting layer provided on a side of incidence of the laser beam, and a dielectric layer and a heat sink layer provided between the recording layer and the light-transmitting layer.

(12) The optical recording medium according to (11), wherein the heat sink layer has a thickness of 10 to 200 nm.

The invention according to (12) can provide a wide power margin with stability without excessively reducing the throughput of a manufacturing process.

(13) The optical recording medium according to (12), wherein the heat sink layer has a thickness of 30 to 100 nm.

The invention according to (13) can provide a wide power margin with improved stability without excessively reducing the throughput of a manufacturing process.

(14) An optical recording medium, having at least a recording layer, for recording information by forming a recording mark on the recording layer with a laser beam, characterized in that a condition of Pw(max1)/Pw(min1) >2.2 is satisfied, with the laser beam having a wavelength of 450 nm or less and an objective lens for focusing the laser beam being designed to have a numerical aperture of 0.7 or more, where Pw(min1) is a lower limit of recording power provided by the laser beam when a jitter value of the recording mark formed is less than 13%, and Pw(max1) is an upper limit of recording power provided by the laser beam when the jitter value of the recording mark formed is less than 13%.

The invention according to (14) can ensure a wide power margin to perform recording operations with stability, even in the case of implementing a high data transfer rate using a system for recording data by focusing a laser beam of a high energy density in a very small spot.

(15) The optical recording medium according to (14), wherein a condition of Pw(max1)/Pw(min1)>2.2 is satisfied with the laser beam being set at a wavelength of 380 to 450 nm.

BEST MODE FOR CARRYING OUT THE INVENTION

Now, the present invention will be explained below in more detail with reference to the drawings in accordance with the preferred embodiments.

Figure 1:
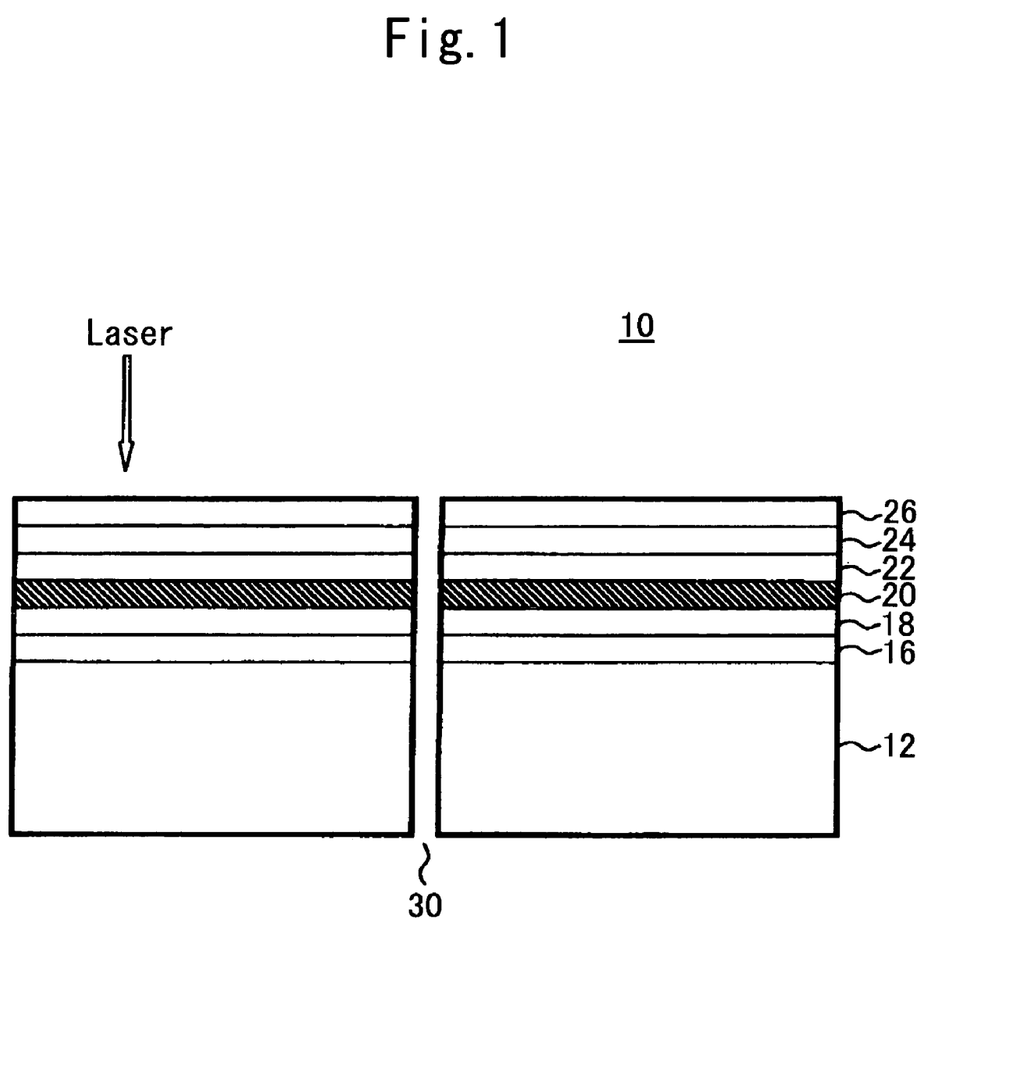
FIG. 1 is a schematic cross-sectional view illustrating the structure of layers in an optical recording medium according to an embodiment of the present invention.

As shown in FIG. 1, an optical recording medium 10 according to this embodiment includes at least a reflective film 16, a second dielectric layer 18, a recording layer 20, a first dielectric layer 22, a heat sink layer 24, and a light-transmitting layer 26, which are formed in that order on a support substrate 12 made of polycarbonate.

In this embodiment, the support substrate 12 is formed of polycarbonate resin by injection molding in a thickness of about 1.1 mm. On top thereof, the reflective film 16, the second dielectric layer 18, the recording layer 20, the first dielectric layer 22, and the heat sink layer 24 are formed in that order by sputtering, with the light-transmitting layer 26 being formed of acrylic-based resin in a thickness of about 100 μm. There is provided a hole 30 at the center portion of the optical recording medium 10. The optical recording medium 10 having such a structure is irradiated with a laser beam from the light-transmitting layer 26 side to thereby record data, while being irradiated with a laser beam from the light-transmitting layer 26 side to thereby reproduce data.

Accordingly, the light-transmitting layer 26 is formed to be considerably thicker in thickness than a resin layer corresponding to the position of the light-transmitting layer 26 in the optical recording medium 10 or a protective layer (about 5 to 10 μm in thickness) on the reflective layer in conventional CDs or DVDs or the like.

The reflective film 16 can be formed of any type of metal materials without limitation as long as it satisfies the required reflectivity, being formed of an alloy composed mainly of Ag in this embodiment. The first dielectric layer 22 can also be formed of any type of materials, being formed of ZnS—$SiO_2$ in this embodiment. The recording layer 20 is formed of AgInSbTeGe-based material having a phase change recording-layer composition.

The second dielectric layer 18 is formed of a material having a thermal conductivity k, where k>1 $W·m^{-1}·K^{-1}$, e.g., alumina ($Al_2O_3$), and has a thickness of 2 nm or more and 200 nm or less, preferably, 5 nm or more and 100 nm or less. On the other hand, the reflective film 16 has a thickness of 10 to 300 nm, the recording layer 20 has a thickness of 5 to 30 nm, the first dielectric layer 22 has a thickness of 10 to 300 nm, and the light-transmitting layer 26 has a thickness of 10 to 300 nm, preferably, 50 to 150 nm. However, the present invention is not limited thereto.

The heat sink layer 24 is formed of a material having a thermal conductivity k, where k>1 $W·m^{-1}·K^{-1}$, e.g., alumina ($Al_2O_3$), and has a thickness of 10 nm or more and 200 nm or less, preferably, 30 nm or more and 100 nm or less.

The heat sink layer 24 is a layer for effectively dissipating heat given to the recording layer 20, serving to provide an enlarged power margin to the optical recording medium 10. Accordingly, the thermal conductivity of the heat sink layer 26 is required to be higher at least than that of the first dielectric layer 22.

More specifically, the heat sink layer 24 is set so that Pmax>Pmin×2.2, where Pmax and Pmin are the maximum and minimum limit power of a laser beam, respectively, at which playback jitter value is less than 13% when reproducing information that has been recorded onto the recording layer by being irradiated from the light-transmitting layer 26 side with the laser beam having a wavelength of 450 nm or less, preferably 380 nm to 450 nm, more preferably 405 nm, via a radiation optical system with an objective lens (not shown) having a numerical aperture of 0.7 or more, preferably 0.85.

The second dielectric layer 18 has a thickness of 2 nm or more because a thickness less than 2 nm would cause a significant variation in the power margin of the laser beam due to a slight variation in thickness. Thus, more preferably, the aforementioned thickness is to be 5 nm or more.

The heat sink layer 24 has a thickness of 10 nm or more because the heat sink layer 24 being specifically less than 10 nm in thickness would make its thickness control difficult while allowing the power margin of the laser beam to be significantly varied due to a slight variation in thickness in the same manner as described above. The thickness being 30 nm or more would make it possible to provide a noticeably increased power margin. Accordingly, the thickness is preferably determined to be 30 nm or more.

Furthermore, the aforementioned thickness is 200 nm or less because a thickness more than 200 nm would require an excessive time for its deposition during manufacturing, thereby resulting in reduced throughput as well as increased thermal damage to the support substrate 12. Accordingly, the thickness is determined to be 200 nm or less, more preferably 100 nm or less. Taking the foregoing into consideration, the thickness of the heat sink layer 24 is preferably set at 10 to 200 nm, more preferably at 30 to 100 nm.

In the aforementioned embodiment, the second dielectric layer 18 and the heat sink layer 24 are made of alumina. The present invention is not limited thereto but may also employ a material having a thermal conductivity within the aforementioned range and formable in the shape of film for covering the recording layer 20 therewith, e.g., aluminum nitride or the like.

Additionally, in the aforementioned embodiment, the light-transmitting layer 26 is made of an acryl-based resin; however, any type of material can also be selected from the group of an energy beam curable resin that is hardened by an energy beam such as an ultraviolet ray or a thermally curable resin that is hardened by heat, thus making the acryl-based resin, the epoxy-based resin, the urethane-based resin or the like applicable. It is also possible to employ a pre-formed resin sheet such as of polycarbonate or polyolefin.

Furthermore, the support substrate 12 may also be made of polyolefin or the like other than the polycarbonate as employed in the embodiment.

The recording layer 20 (AgInSbTeGe) of the optical recording medium 10 is made of a phase change film having different values of reflectivity between in the crystalline state and in the amorphous state, which is utilized for recording data. More specifically, the recording layer 20 of a non-recorded area is in a crystalline state with 20% reflectivity, for example. To record any data onto such a non-recorded area, a predetermined portion in the recording layer 20 is heated to a temperature higher than the melting point in accordance with the data to be recorded and then quickly cooled down into an amorphous state. The portion in the amorphous state has, e.g., 7% reflectivity, thus allowing the predetermined data to be recorded. To overwrite the data once recorded, the portion of the recording layer 20 in which the data to be overwritten is recorded is heated to a temperature higher than the crystallization point or the melting point in accordance with the data to be recorded and thus changed into the crystalline state or an amorphous state.

In this case, the relation between the power Pw (recording power) of a laser beam with which the recording layer 20 is irradiated to melt, the power Pb (ground power) of a laser beam with which the recording layer 20 is irradiated to cool down, and the Pe (erasing power) of a laser beam with which the recording layer 20 is irradiated to crystallize is expressed by Pw>Pe≧Pb.

The optical recording medium 10 according to this embodiment preferably stores "recording condition setting information," though the present invention is not limited thereto. The recording condition setting information refers to various conditions necessary to record/reproduce data on/from the optical recording medium 10, e.g., information used for identifying the power of a recording laser beam or a recording strategy. The recording condition setting information includes not only those pieces specifically indicative of each condition necessary to record/reproduce data but also those pieces for identifying a recording/reproduction condition by specifying any of the various conditions stored in an information recording apparatus.

On the other hand, the "recording strategy" refers to a method of irradiation with a recording laser beam to form recording marks, i.e., the settings such as the number of laser beam pulses, the pulse width of each pulse, the pulse interval, and the power of the laser beam (Pw, Pe, and Pb), which are determined in accordance with the recording condition setting information included in the optical recording medium 10.

To record data on the optical recording medium 10 according to this embodiment, it is necessary to set the recording power Pw of a laser beam within an appropriate range. If the recording power Pw is out of the appropriate range, recording marks cannot be formed in a proper shape, thus causing jitter to be significantly degraded. The range of the recording power Pw in which the jitter value of the recording mark formed is 13% or less is referred to as "the first power margin," the lower limit power of which is defined as Pw(min1) and the upper limit power of which is defined as Pw(max1). In this case, the optical recording medium 10 according to this embodiment allows the ratio of the upper limit power Pw(max1) to the lower limit power Pw(min1) to satisfy the condition given by $$Pw(\text{max1})/Pw(\text{min1}) > 2.2 \qquad (1).$$

Preferably, the ratio of the upper limit power Pw(max1) to the lower limit power Pw(min1) satisfies the condition given by $$Pw(\text{max1})/Pw(\text{min1}) > 2.5 \qquad (2), \text{ and}$$

more preferably, the condition given by $$Pw(\text{max1})/Pw(\text{min1}) > 3 \qquad (3).$$

In general, with jitter values exceeding 13%, a large amount of read errors would occur. Accordingly, information necessary to set the recording power Pw of a laser beam within the range of Pw(min1) to Pw(max1) is contained in the recording condition setting information, thereby making it possible to effectively reduce the occurrence of read errors.

The range of the recording power Pw in which the jitter value of the recording mark formed is 9% or less is referred to as "the second power margin," the lower limit power of which is defined as Pw(min2) and the upper limit power of which is defined as Pw(max2). In this case, the optical recording medium 10 according to this embodiment allows the ratio of the upper limit power Pw(max2) to the lower limit power Pw(min2) to satisfy the condition given by $$Pw(\text{max2})/Pw(\text{min2}) > 1.5 \qquad (4),$$

preferably, the condition given by $$Pw(\text{max2})/Pw(\text{min2}) > 1.8 \qquad (5), \text{ and}$$

more preferably, the condition given by $$Pw(\text{max2})/Pw(\text{min2}) > 2 \qquad (6).$$

In general, with jitter values exceeding 9%, there would be a high possibility of occurrence of read errors. Accordingly, information necessary to set the recording power Pw of a laser beam within the range of Pw(min2) to Pw(max2) is contained in the recording condition setting information, thereby making it possible to effectively reduce the occurrence of read errors.

Now, a method for fabricating the optical recording medium 10 according to this embodiment will be described below.

Figure 2:
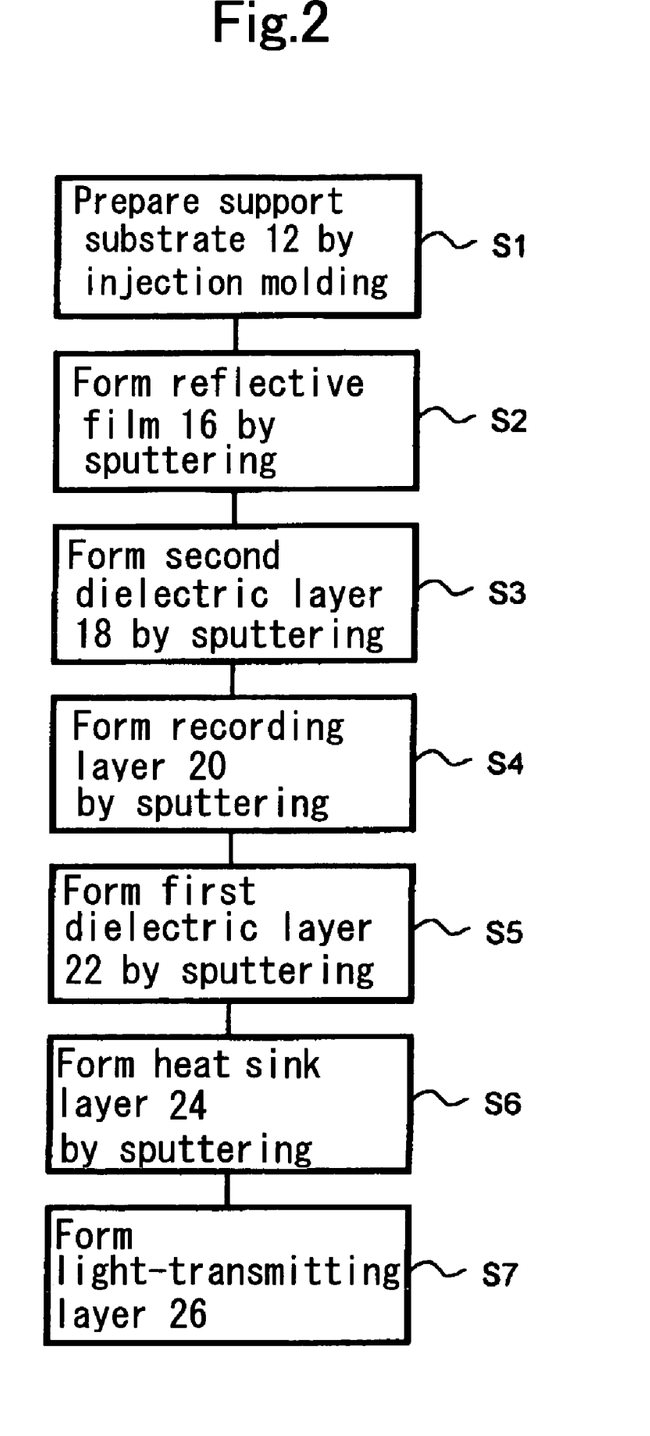
FIG. 2 is a flowchart showing a method for fabricating an optical recording medium 10.

FIG. 2 is a flowchart showing the method for fabricating the optical recording medium 10 according to this embodiment. As described above, the light-transmitting layer 26 of the optical recording medium 10 is as very thin as 10 to 300 μm in thickness, and is therefore deposited in the reverse order to that of the conventional general DVD-RW.

First, a stamper is used to injection mold a support substrate 12 having a thickness of about 1.1 mm, with a pre-groove of groove width about 0.151 μm, track pitch about 0.32 μm, and groove depth about 20 nm (step S1).

Then, the support substrate 12 is transported into a first chamber (not shown) of a sputtering apparatus. The sputtering apparatus is provided in the first chamber with an alloy composed mainly of silver as a target. Then, the first chamber is pumped into a vacuum of about $1 \times 10^4$ Pa. Subsequently, an argon gas is introduced into the first chamber to set the gas pressure at 0.1 to 1.0 Pa. Thereafter, a DC or RF voltage is applied to the target for sputtering. In this manner, on top of the support substrate 12, there is formed a reflective film 16 of 10 to 300 nm in thickness (step S2).

Then, the support substrate 12 having the reflective film 16 formed thereon is transported from the first chamber to a second chamber (not shown). In the second chamber of the sputtering apparatus, provided is $Al_2O_3$ as a target.

Then, the second chamber is pumped into a vacuum of about $1\times10^{-4}$ Pa. Subsequently, an argon gas is introduced into the second chamber to set the gas pressure at 0.1 to 1.0 Pa for sputtering. In this manner, on top of the reflective film 16, there is formed a second dielectric layer 18 having a thickness of 2 to 50 nm (step S3).

Then, the support substrate having the reflective film 16 and the second dielectric layer 18 formed thereon is transported from the second chamber to a third chamber (not shown). In the third chamber of the sputtering apparatus, provided is a target mixture of Ag, In, Sb, Te, and Ge. Then, the third chamber is pumped into a vacuum of about $1\times10^{-4}$ Pa. Subsequently, an argon gas is introduced into the third chamber to set the gas pressure at 0.1 to 1.0 Pa for sputtering. In this manner, on top of the second dielectric layer 18, there is formed a recording layer 20 having a thickness of 5 to 30 nm (step S4).

Then, the support substrate 12 having the reflective film 16 to the recording layer 20 formed thereon is transported from the third chamber to a fourth chamber (not shown). In the fourth chamber of the sputtering apparatus, provided is a target mixture of ZnS and $SiO_2$. Then, the fourth chamber is pumped into a vacuum of about $1\times10^{-4}$ Pa. Subsequently, an argon gas is introduced into the fourth chamber to set the gas pressure at 0.1 to 1.0 Pa for sputtering. In this manner, on top of the recording layer 20, there is formed a first dielectric layer 22 having a thickness of 10 to 300 nm (step S5).

Then, the support substrate 12 having the reflective film 16 to the first dielectric layer 22 formed thereon is transported from the fourth chamber to a fifth chamber (not shown). In the fifth chamber of the sputtering apparatus, provided is a target of $Al_2O_3$. Then, the fifth chamber is pumped into a vacuum of about $1\times10^{-4}$ Pa. Subsequently, an argon gas is introduced into the fifth chamber to set the gas pressure at 0.1 to 1.0 Pa for sputtering. In this manner, on top of the first dielectric layer 22, there is formed a heat sink layer 24 having a thickness of 10 to 200 nm, preferably 30 to 100 nm (step S6). The sputtering of the heat sink layer 24 may also be carried out in the second chamber.

In this manner, the reflective film 16, the second dielectric layer 18, the recording layer 20, the first dielectric layer 22, and the heat sink layer 24 are formed on the support substrate. Then, a substrate 11 having each of these layers formed thereon is taken out of the fifth chamber of the sputtering apparatus and then coated on the surface of the heat sink layer 24 with an UV curable resin such as by spin coating, by roll coating, or by screen printing. Then, the resulting substrate 11 is irradiated with an ultraviolet radiation to thereby form a light-transmitting layer 26 having a thickness of about 10 to 300 µm (step S7). In this manner, the optical recording medium 10 according to this embodiment is completed. To form the light-transmitting layer 26, a pre-molded resin sheet material such as of polycarbonate or polyolefin may also be adhered to the surface of the heat sink layer 24.

Now, an apparatus for recording data onto the optical recording medium 10 according to this embodiment will be described below.

Figure 3:
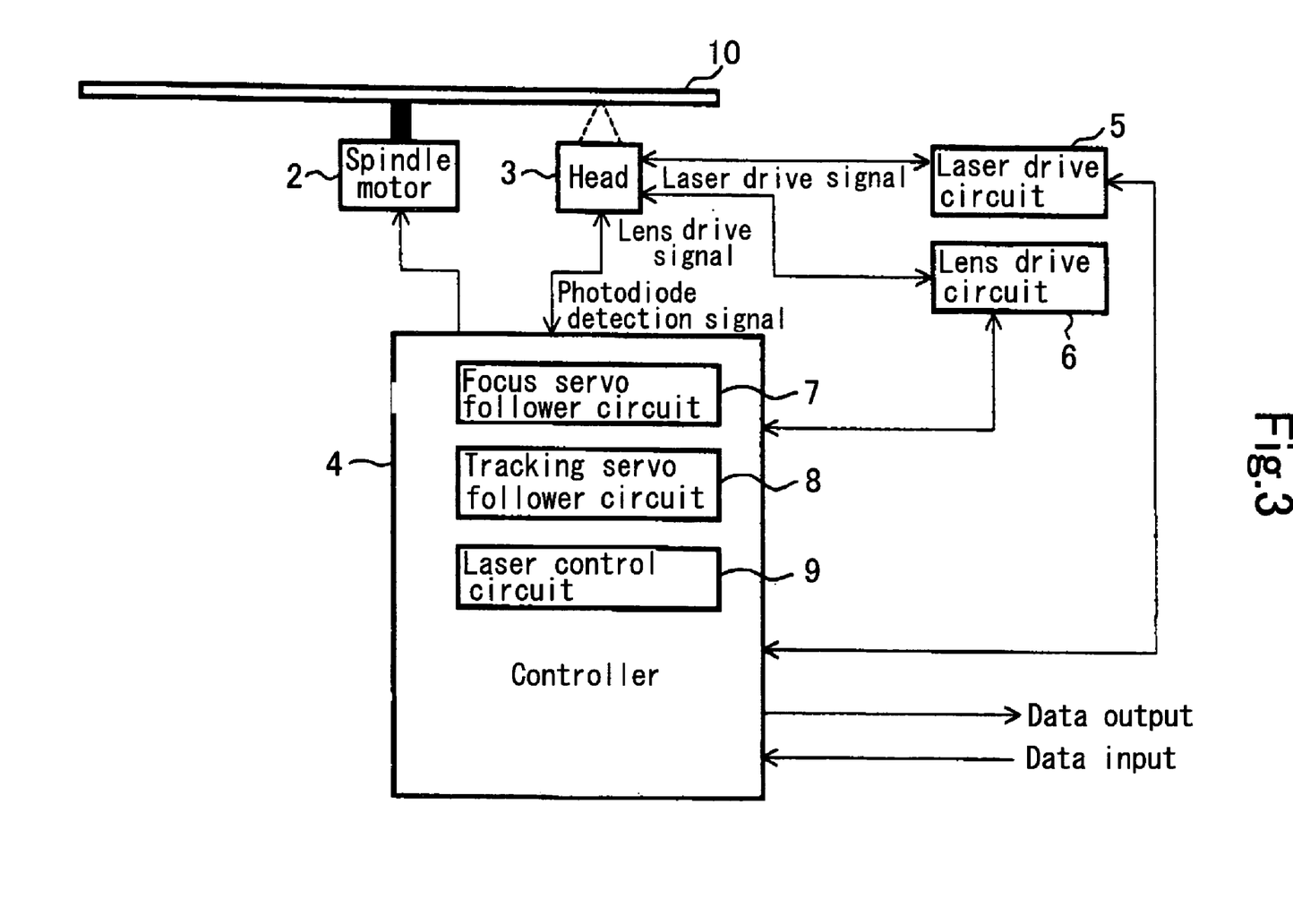
FIG. 3 is a schematic view illustrating the main portion of an information recording apparatus suitable for recording data onto the optical recording medium 10.

FIG. 3 is a schematic view illustrating the main portion of an information recording apparatus suitable for recording data onto the optical recording medium 10.

As shown in FIG. 3, such an information recording/reproducing apparatus includes a spindle motor 2 for rotating the optical recording medium 10, a head 3 for irradiating the optical recording medium 10 with a laser beam, a controller 4 for controlling the operations of the spindle motor 2 and the head 3, a laser drive circuit 5 for supplying a laser drive signal to the head 3, and a lens drive circuit 6 for supplying a lens drive signal to the head 3.

As shown in FIG. 3, the controller 4 includes a focus servo follower circuit 7, a tracking servo follower circuit 8, and a laser control circuit 9. Activating the focus servo follower circuit 7 would allow the recording surface of the optical recording medium 10 being rotated to be focused, while activating the tracking servo follower circuit 8 would allow the spot of a laser beam to automatically follow an eccentric signal track of the optical recording medium 10. The focus servo follower circuit 7 and the tracking servo follower circuit 8 are provided with an automatic gain control function for automatically adjusting focus gain and an automatic gain control function for automatically adjusting tracking gain, respectively. The laser control circuit 9 generates a laser drive signal to be supplied by the laser drive circuit 5, while generating an appropriate laser drive signal in accordance with recording condition setting information stored in the optical recording medium 10, if any.

These focus servo follower circuit 7, the tracking servo follower circuit 8, and the laser control circuit 9 do not always need to be incorporated into the controller 4 but may also be prepared separately from the controller 4. Furthermore, these circuits need not to be always in the form of a physical circuit but may also be in the form of software to be executed in the controller 4.

Although not limited to the following particular arrangement, the information recording apparatus suitable for recording data onto the optical recording medium 10 employs preferably a laser beam of wavelength 450 nm or less, particularly 380 to 450 nm, and an objective lens or part of the head 3 for focusing a recording laser beam, having an NA (numerical aperture) of 0.7 or more. In recording data onto the optical recording medium 10 using such an information recording apparatus, a distance (working distance) to be set between the objective lens and the surface of the optical recording medium 10 is very small (e.g., about 80 to 150 µm), thereby making it possible to realize a beam spot of a significantly reduced diameter as compared with the conventional one. This makes it possible to realize an extremely high data transfer rate (e.g., 35 Mbps or greater) in recording data onto the optical recording medium 10 using such an information recording apparatus.

Additionally, as described above, in recording data onto the optical recording medium 10 according to this embodiment using such an information recording apparatus, a recording strategy determined in accordance with recording condition setting information stored on the optical recording medium 10, if any, is used to determine the recording power Pw of the laser beam.

The aforementioned information recording apparatus 30 can also employ a (1, 7) RLL modulation scheme, though the present invention is not limited thereto. However, the information recording apparatus for recording data onto the optical recording medium 10 does not always need to employ such a modulation scheme to record data but may also employ other modulation schemes for recording data.

Now, an exemplary recording strategy will be described below which employs the (1, 7) RLL modulation scheme.

Figure 4:
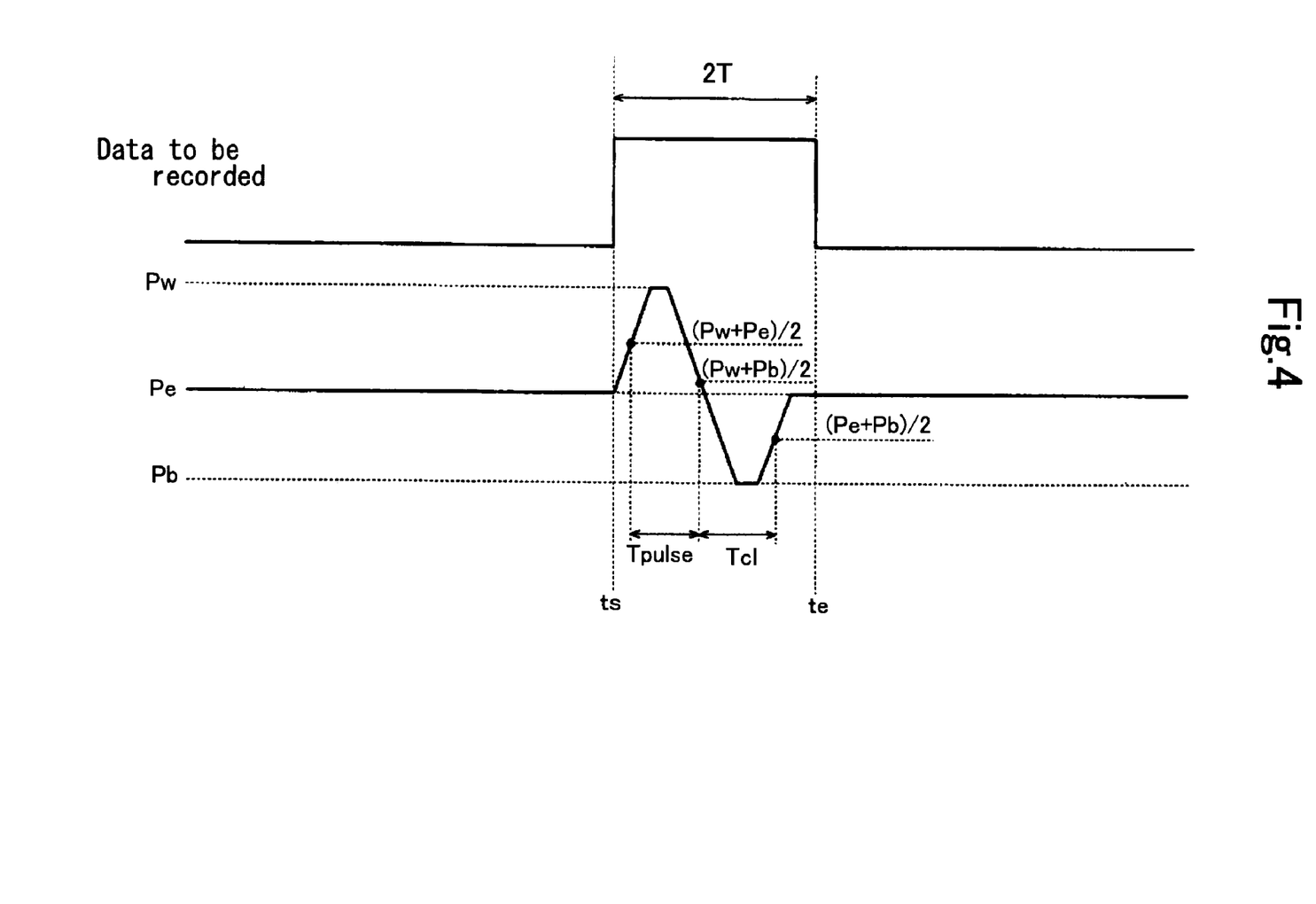
FIG. 4 is a view illustrating an exemplary recording strategy for forming a recording mark of a length corresponding to 2T.

FIG. 4 is a view illustrating an exemplary recording strategy for forming a recording mark of a length corresponding to 2T.

As shown in FIG. 4, to form a recording mark of a length corresponding to 2T, the number of laser beam pulses is set at "1." In the foregoing, the number of laser beam pulses is defined by the number of times of raising the power of the laser beam up to Pw. In more detail, suppose that the timing at which the laser beam is positioned at the start point of a recording mark is time ts, and the timing at which the laser beam is positioned at the end point of the recording mark is time te. In this case, the power of the laser beam is raised once up to Pw and then to power Pb during the period from time ts to time te. The power of the recording laser beam is set at Pe before time ts, allowing the laser beam to rise at time ts. On the other hand, the power of the laser beam is set at Pe or Pb at time te.

During the duration of Tpulse, the recording layer 20 of the optical recording medium 10 is subjected to a high energy to have a temperature higher than the melting point, whereas during the duration of Tcl, the recording layer 20 of the optical recording medium 10 is quickly cooled down. This allows the recording mark of a length corresponding to 2T to be formed in the recording layer 20 of the optical recording medium 10.

To form a recording mark of another length, like the recording mark of a length corresponding to 2T being formed, the power of the laser beam is set at Pw, Pe, or Pb, thus forming recording marks having a predetermined length each with a predetermined number of pulses.

The optical recording medium 10 according to this embodiment provides a wide power margin as described above. It is therefore possible to reduce jitter even when the power of the laser beam is significantly different from the desired level due to manufacturing variations of the laser driver included in the head 3 or in the presence of variations in the power of the laser beam caused for some reason. In particular, the optical recording medium 10 according to this embodiment can provide good jitter even when a laser beam of a relatively strong recording power is used to form recording marks. Accordingly, a sufficient power margin can be secured even when recording is carried out at a high data transfer rate setting (e.g., 35 Mbps or more).

Now, examples of the present invention will be explained in detail below.

EXAMPLE 1

An optical recording medium was prepared in accordance with the following procedures.

A disc-shaped support substrate was employed which was made of a polycarbonate resin like in the aforementioned embodiment and which had a surface having grooves formed thereon (the depth of the grooves was $\lambda/18$ when expressed by an optical path length at a wavelength $\lambda=405$ nm with a record track pitch of 0.32 μm). On this surface, formed was a reflective film composed mainly of Ag by sputtering in a thickness of 100 nm.

Then, on the surface of the reflective film, formed was a second dielectric layer of $Al_2O_3$ by sputtering in a thickness of 20 nm.

Additionally, a recording layer was formed by sputtering in a thickness of 12 nm on the second dielectric layer using an alloy target of a phase change material. This recording layer was chosen to have a composition of AgInSbTeGe.

Furthermore, on the surface of the recording layer, a first dielectric layer was formed by sputtering in a thickness of 45 nm using a ZnS(80 mol %)-$SiO_2$ (20 mol %) target.

Like the aforementioned second dielectric layer, a heat sink layer of $Al_2O_3$ was formed by sputtering in a thickness of 30 nm on the surface of the first dielectric layer.

Then, an UV curable resin was coated by spin coating on the surface of the heat sink layer, and then irradiated with an ultraviolet radiation to thereby obtain a light-transmitting layer having a thickness of 100 μm.

COMPARATIVE EXAMPLE 1 COMPARATIVE EXAMPLE 2

Furthermore, the heat sink layer was removed from the aforementioned example 1 to prepare comparative example 1, while the second dielectric layer of the aforementioned comparative example 1 was substituted into the same dielectric layer as the first dielectric layer of the aforementioned example 1 and the comparative example 1 to prepare comparative example 2.

Figure 5:
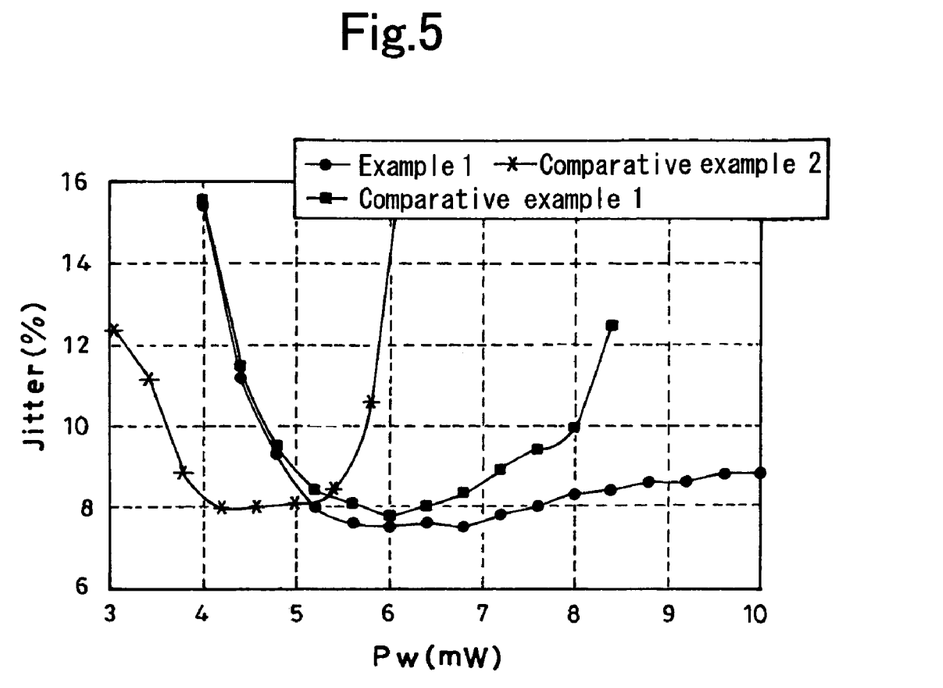
FIG. 5 is a diagram illustrating the relation between the power of a recording laser beam and the playback jitter value for an optical recording medium according to Example 1 of the present invention, in conjunction with a comparative example.

As with the aforementioned embodiment, recording was performed with these comparative examples under the conditions of a wavelength $\lambda=405$ nm and a numerical aperture of the objective lens NA=0.85 with a ratio of Pe/Pw fixed to 0.55 (where Pe is the erasing power and Pw is the recording power) and with the power of the laser beam varied in a range of 3 mW to 10 mW. Thereafter, the playback jitter value was measured as shown in FIG. 5. In the foregoing, the recording was performed only on one track (groove).

With reference to FIG. 5, Table 1 shows in comparison the maximum limit power Pmax and the minimum limit power Pmin at which the playback jitter value was below 13% in the aforementioned example 1, comparative example 1, and comparative example 2.

TABLE 1

|  | Pmin | Pmax | Pmax/Pmin |
| --- | --- | --- | --- |
| Example 1 | 4.2 | Unmeasurable | >2.2 |
| Comparative example 1 | 4.2 | 8.5 | 2.02 |
| Comparative example 2 | 2.8 | 5.9 | 2.11 |

As can be seen from FIG. 5 and Table 1 as well, in the comparative examples 1 and 2, the maximum limit power Pmax is about twice the minimum limit power Pmin of the laser beam at which the playback jitter value is below 13%. However, in the example 1, as can also be seen from FIG. 2, the maximum limit power exceeds 10 mW and is thus unmeasurable while the minimum limit power of the laser beam at which the playback jitter value is below 13% is 4.2 mW.

That is, in the example 1, Pmax was more than 2.2 times Pmin.

EXAMPLE 2

The example 2 is provided with a high recording sensitivity by changing the first dielectric layer of the example 1 to 35 nm in thickness (assuming the example 1 has a low sensitivity).

Figure 6:
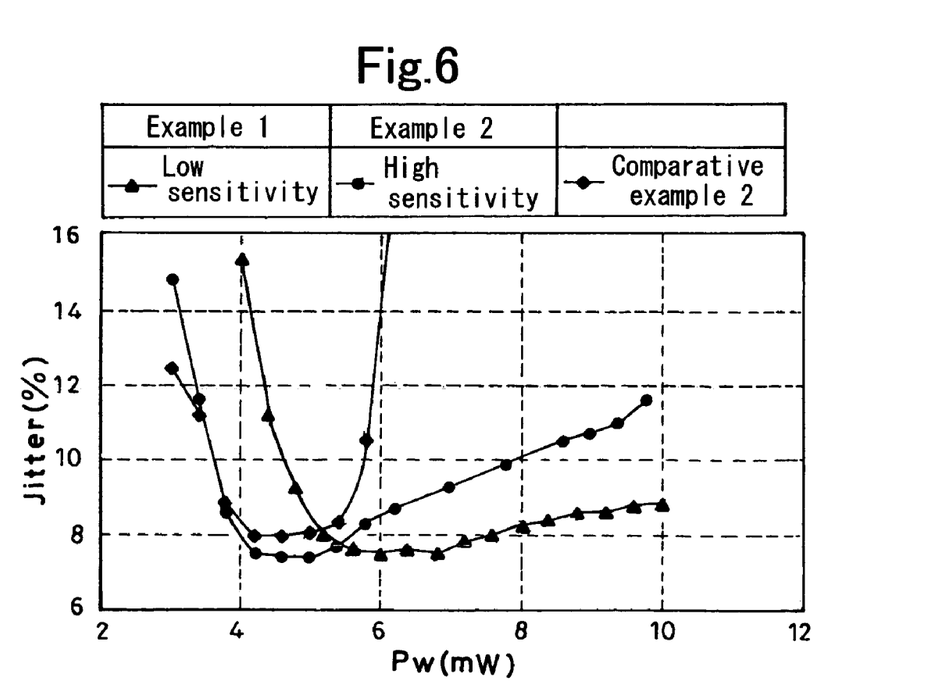
FIG. 6 is a diagram illustrating the relation between the power of a recording laser beam and the playback jitter value for an optical recording medium according to Example 2 of the present invention, in conjunction with Example 1 and a comparative example.

Measurements were made on the playback jitter values of these recording media having a low and high sensitivity and the recording medium according to the comparative example 2 to obtain the values as shown in FIG. 6.

Like Table 1 above, Table 2 shows the minimum limit power Pmin and the maximum limit power Pmax of the laser beam according to the examples of a low and high sensitivity and the comparative example 2, and Pmax/Pmin.

TABLE 2

|  | Pmin | Pmax | Pmax/Pmin |
|---|---|---|---|
| Example 1 (Low sensitivity) | 4.2 | >10 | >2.2 |
| Example 2 (High sensitivity) | 3.2 | 10.1 | 3.16 |
| Comparative example 2 | 2.8 | 5.9 | 2.11 |

As can be seen from FIG. 6 and Table 2 as well, the example of the present invention provides Pmax/Pmin greater than or equal to 2.2.

EXAMPLE 3

Figure 7:
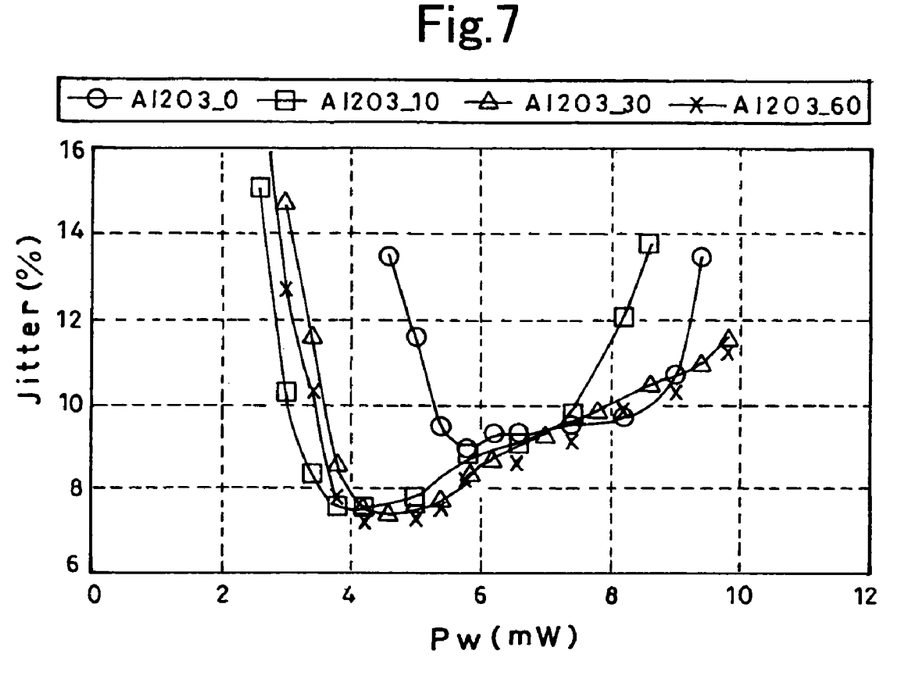
FIG. 7 is a diagram illustrating the power of a recording laser beam and the playback jitter value for an optical recording medium according to Example 3 of the present invention.

Now, the heat sink layer of the optical medium according to the example 2 was changed in thickness to measure how it would affect the playback jitter value, the measurements being obtained as shown in FIG. 7.

The heat sink layer was formed in a thickness of three types of values 10 nm, 30 nm, and 60 nm. FIG. 7 also shows a comparative example of the heat sink layer having a thickness of 0 nm.

Figure 8:
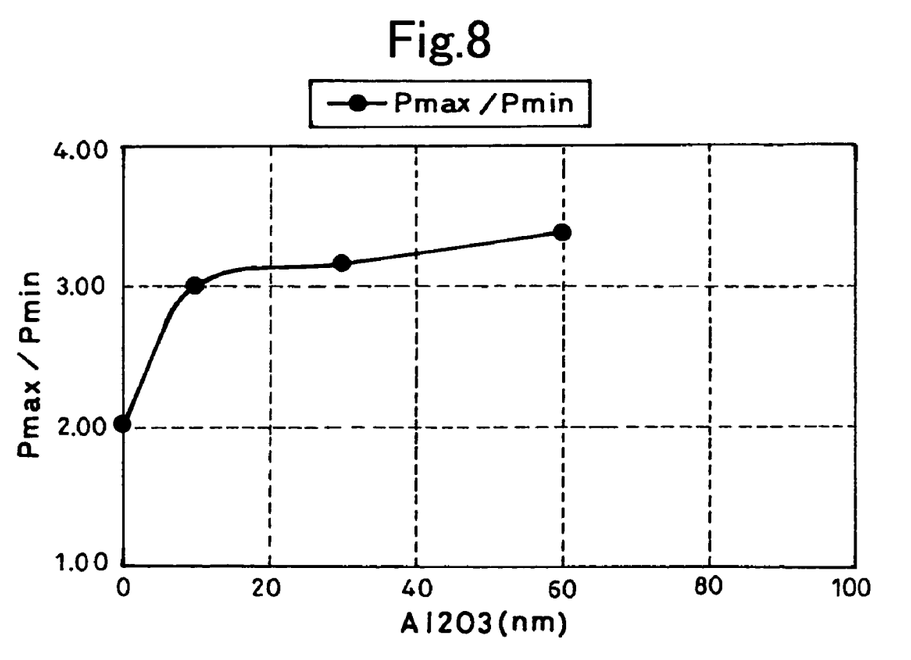
FIG. 8 is a diagram illustrating the relation between the thickness of a heat sink layer and Pmax/Pmin from the results of FIG. 7.

FIG. 8 illustrates the relation between the Pmax/Pmin and the thickness of the heat sink layer according to these examples.

From FIGS. 7 and 8, it can be seen that the heat sink layer having even an slight thickness provides Pmax/Pmin greater than 2.2. Additionally, FIG. 8 shows that the heat sink layer having a thickness of even about 100 nm can provide Pmax/Pmin greater than or equal to 2.2. It can also be expected that a thickness of even about 200 nm would provide Pmax/Pmin greater than 2.2.

EXAMPLE 4

The aforementioned method was employed to fabricate optical recording media 10-1, 10-2, 10-3, and 10-4 in the structure shown in FIG. 1 each with the support substrate 12 having a thickness of 1.1 mm, the reflective film 16 having a thickness of 100 nm, the second dielectric layer 18 having a thickness of 20 nm, the recording layer 20 having a thickness of 12 nm, the first dielectric layer 15 having a thickness of 35 nm, the light-transmitting layer 26 having a thickness of 100 μm, and the heat sink layer 24 having respective thicknesses of 0 nm, 10 nm, 30 nm, and 60 nm.

On these optical recording media 10-1, 10-2, 10-3, and 10-4, various types of recording power Pw (10 mW at maximum) were employed to create a signal mixture made up of recording marks having lengths corresponding to 2T to 8T under the conditions shown in Table 3. The (1, 7) RLL modulation scheme was employed for recording data only on one track.

TABLE 3

| Clock frequency | 66 MHz |
|---|---|
| Clock cycle (1T) | 15.15 nsec |
| Linear speed | 5.3 m/sec |
| Modulation scheme | (1, 7)RLL |
| Format efficiency | 80% |
| Data transfer rate (efficiency considered) | 35 Mbps |
| Channel bit length | 0.12 μm/bit |
| Numerical aperture (NA) | 0.85 |
| Laser wavelength | 405 nm |
| Pe | Pw × 0.55 |
| Pb | 0.1 mW |

Then, the clock jitter of the signal mixture created on the optical recording media 10-1, 10-2, 10-3, and 10-4 was measured. In the measurements, a time interval analyzer was used to determine the "fluctuation σ" of the playback signal to calculate σ/Tw (where Tw is one clock cycle).

Figure 9:
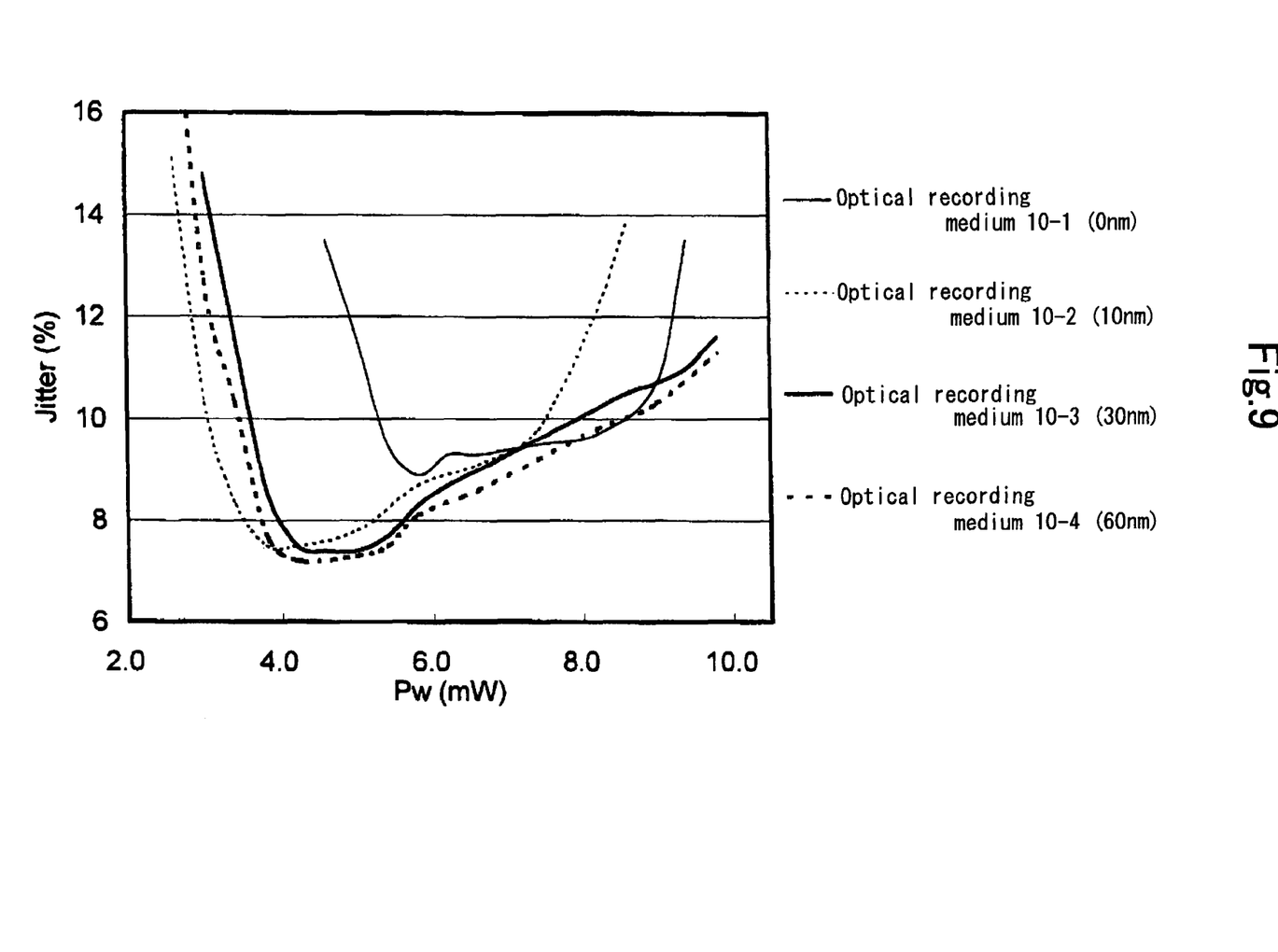
FIG. 9 is a graph showing the results of measurements in Example 4.

The results of the measurements are shown in FIG. 9. The legends indicated in parentheses of those shown in FIG. 9 are the thicknesses of the heat sink layer 16.

As shown in FIG. 9, it can be seen that the optical recording media 10-2, 10-3, and 10-4 having the heat sink layer 24 provide a much wider power margin than the optical recording medium 10-1 having no heat sink layer 24 (0 nm). Table 4 shows specific power margins.

TABLE 4

|  | Pw(min1) | Pw(min2) | Pw(max2) | Pw(max1) | Pw(max1)/Pw(min1) | Pw(max2)/Pw(min2) |
|---|---|---|---|---|---|---|
| Optical recording medium 10-1 | 4.7 mW | 5.7 mW | 5.9 mW | 9.3 mW | 1.98 | 1.04 |
| Optical recording medium 10-2 | 2.8 mW | 3.2 mW | 6.4 mW | 8.4 mW | 3.00 | 2.00 |
| Optical recording medium 10-3 | 3.2 mW | 3.7 mW | 6.6 mW | >10 mW | >3.13 | 1.78 |
| Optical recording medium 10-4 | 3.0 mW | 3.6 mW | 7.1 mW | >10 mW | >3.33 | 1.97 |

As shown in Table 4, it is seen that the optical recording medium 10-1 having no heat sink layer 24 (0 nm) provides Pw(max1)/Pw(min1)<2.2, whereas the optical recording media 10-2, 10-3, and 10-4 having the heat sink layer 16 provide Pw(max1)/Pw(min1)>2.2. In particular, the optical recording media 10-3 and 10-4 with the heat sink layer 24 having a thickness of 30 nm and 60 nm, respectively, produce jitter below 1.3% at a recording power setting of 10 mW, with Pw(max1)/Pw(min1)>3. As described above, it is seen that the optical recording media 10-3 and 10-4 with the heat sink layer 24 having a thickness of 30 nm and 60 nm, respectively, have a region of jitter 13% or less, i.e., a very wide first power margin.

Furthermore, as shown in Table 4, the optical recording medium 10-1 having no heat sink layer 24 (0 nm) provides Pw(max2)/Pw(min2)<1.5, whereas the optical recording media 10-2, 10-3, and 10-4 having the heat sink layer 24 provide Pw(max2)/Pw(min2)>1.5. In particular, the optical recording media 10-2 and 10-4 with the heat sink layer 24 having a thickness of 10 nm and 60 nm, respectively, provide Pw(max2)/Pw(min2)>1.8. As described above, it is seen that the optical recording media 10-2 and 10-4 with the heat sink layer 24 having a thickness of 30 nm and 60 nm, respectively, have a region of jitter 9% or less, i.e., a very wide second power margin.

From this example, it was confirmed that setting the heat sink layer 24 to a thickness of 10 nm or greater, with the other layers having the same structure, will provide an enlarged power margin, and in particular, setting the heat sink layer 24 at 60 nm in thickness will provide a significantly enlarged power margin.

EXAMPLE 5

The aforementioned method was employed to fabricate an optical recording medium 10-5 in the structure shown in FIG. 1, with the support substrate having a thickness of 1.1 mm, the reflective film 16 having a thickness of 100 nm, the second dielectric layer 18 having a thickness of 20 nm, the recording layer 14 having a thickness of 12 nm, the first dielectric layer 22 having a thickness of 45 nm, and the heat sink layer 24 having a thickness of 30 nm. This optical recording medium 10-5 is different from the aforementioned optical recording medium 10-3 only in that the first dielectric layer 22 has been changed in thickness. This causes the optical recording medium 10-5 to have a lower recording sensitivity than the aforementioned optical recording medium 10-3 does.

On the optical recording medium 10-5, various types of recording power Pw (10 mW at maximum) were employed to create a signal mixture made up of recording marks having lengths corresponding to 2T to 8T under the conditions shown in Table 3. The (1, 7) RLL modulation scheme was employed for recording data on only one track.

Then, the clock jitter of the signal mixture created on the optical recording medium 10-5 was measured.

Figure 10:
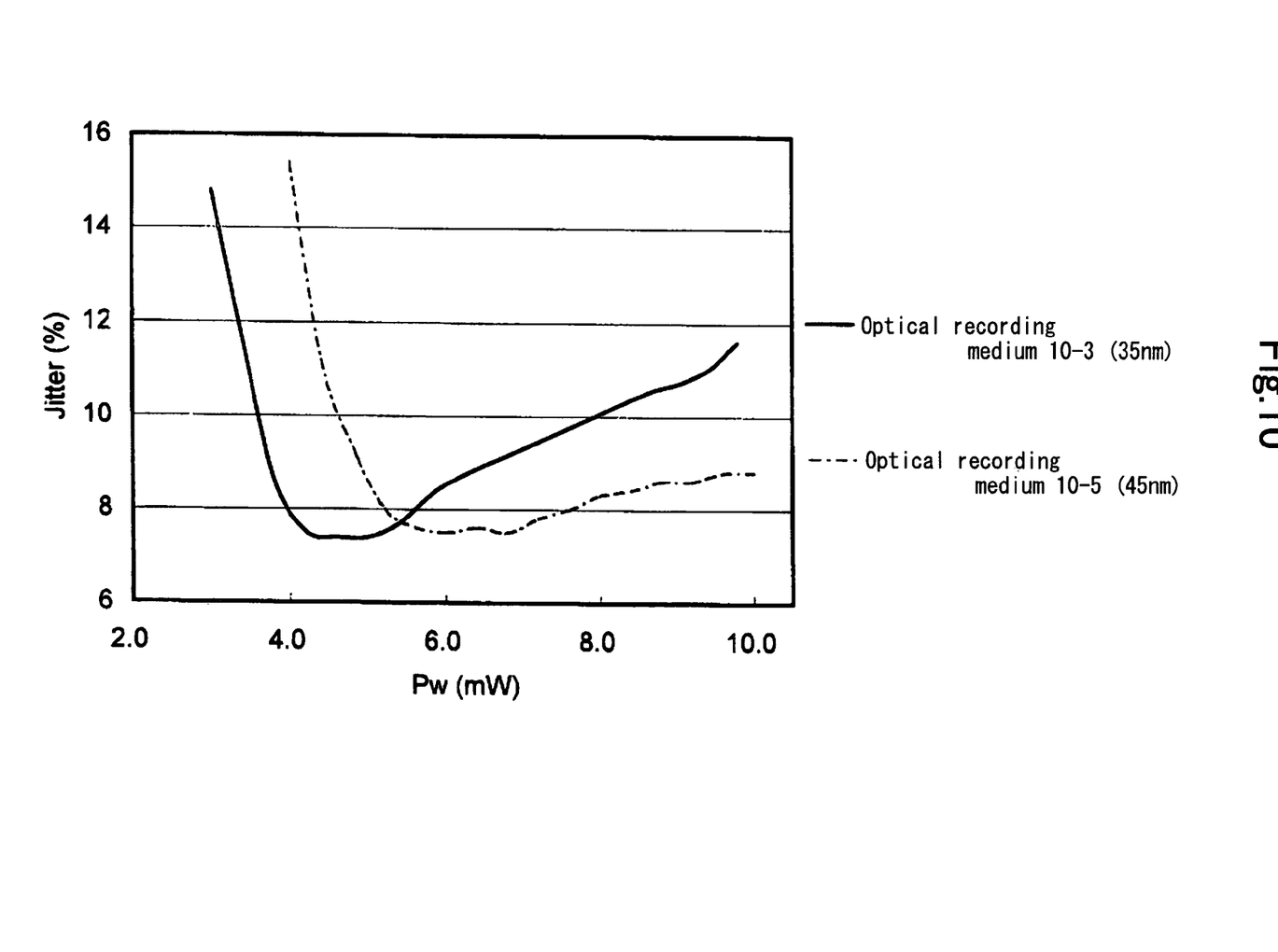
FIG. 10 is a graph showing the results of measurements in Example 5.

The results of the measurements are shown in FIG. 10. FIG. 10 also shows the results of the measurements made on the optical recording medium 10-3 with the heat sink layer 24 having the same thickness as that in the optical recording medium 10-5. The legends indicated in parentheses of those shown in FIG. 6 are the thicknesses of the first dielectric layer 22.

As described above, it can be confirmed that the optical recording medium 10-5 has a lower recording sensitivity than the optical recording medium 10-3 does, so that the sufficiently low jitter region is shifted toward the higher output power, but provides a sufficiently wide power margin like the optical recording medium 10-3. Table 5 shows specific power margins.

From this example, it was confirmed that with the heat sink layer 24 having the same thickness, the first dielectric layer 22 could also be changed in thickness to adjust the recording sensitivity, while providing a sufficiently wide power margin.

As described above, the optical recording medium 10 according to this embodiment is adapted such that the ratio of the upper limit power Pw(max1) to the lower limit power Pw(min1) satisfies the condition given by $$Pw(\max 1)/Pw(\min 1) > 2.2 \tag{1},$$

thus providing reduced jitter even in the presence of variations in power of the recording laser beam caused for some reason.

The present invention is not limited to the aforementioned embodiment, but various modifications can also be made thereto within the scope of the present invention defined by the appended claims, and those modifications are to be included in the scope of the present invention.

For example, in the aforementioned embodiment, the structure of FIG. 1 was shown as a specific structure of the optical recording medium 10; however, the structure of the optical recording medium according to the present invention is not limited thereto.

INDUSTRIAL APPLICABILITY

The present invention is configured as described above, and thus has an advantageous effect of being able to provide an enlarged power margin to a recording laser beam. Furthermore, the optical recording medium according to the present invention provides a very wide power margin, thereby making it possible to record data with stability.

The invention claimed is:

1. An optical recording medium, having at least a light-transmitting layer covered with a recording layer formed on a support substrate, for recording information on the recording layer by a laser beam incident from the light-transmitting layer, wherein the recording layer is provided with a heat sink layer on its light-transmitting layer side, the heat sink layer being made of a material having a thermal conductivity of greater than 1 $W \cdot m^{-1} \cdot K^{-1}$, and the heat sink layer is set so that Pmax>Pmin×2.2, where Pmax and Pmin are maximum and minimum limit powers of a laser beam having a wavelength of 450 nm or less, respectively, at which a playback jitter value is less than 13% when reproducing information that has been recorded onto the recording layer by being irradiated with the laser beam via a radiation optical system with an objective lens having a numerical aperture of 0.7 or more.

TABLE 5

|  | Pw(min1) | Pw(min2) | Pw(max2) | Pw(max1) | Pw(max1)/ Pw(min1) | Pw(max2)/ Pw(min2) |
| --- | --- | --- | --- | --- | --- | --- |
| Optical recording medium 10-5 | 4.2 mW | 4.9 mW | >10 mW | >10 mW | >2.38 | >2.04 |

As shown in Table 5, the optical recording medium 10-5 produces jitter below 13% at a recording power setting of 10 mW, with Pw(max1)/Pw(min1)>2.2.

Furthermore, as shown in Table 3, the optical recording medium 10-5 produces jitter below 9% at a recording power setting of 10 mW, with Pw(max2)/Pw(min2)>2.

2. The optical recording medium according to claim 1, wherein the laser beam has a wavelength of 380 nm or more.

3. The optical recording medium according to claim 1, wherein the heat sink layer has a thickness of 10 nm or more and 200 nm or less, preferably 30 nm or more and 100 nm or less.

4. The optical recording medium according to claim 2, wherein the heat sink layer has a thickness of 10 nm or more and 200 nm or less, preferably 30 nm or more and 100 nm or less.

5. An optical recording medium, having at least a recording layer, for recording information by forming a recording mark on the recording layer with a laser beam, wherein a condition of Pw(max1)/Pw(min1)>2.2 is satisfied, where Pw(min1) is a lower limit of recording power provided by the laser beam when a jitter value of the recording mark formed is less than 13%, and Pw(max1) is an upper limit of recording power provided by the laser beam when the jitter value of the recording mark formed is less than 13%.

6. The optical recording medium according to claim 5, wherein a condition of Pw(max1)/Pw(min1)>2.5 is satisfied.

7. The optical recording medium according to claim 5, wherein a condition of Pw(max1)/Pw(min1)>3 is satisfied.

8. The optical recording medium according to claim 5, wherein a condition of Pw(max2)/Pw(min2)>1.5 is satisfied, where Pw(min2) is a lower limit of recording power provided by the laser beam when the jitter value of the recording mark formed is less than 9%, and Pw(max2) is an upper limit of recording power provided by the laser beam when the jitter value of the recording mark formed is less than 9%.

9. The optical recording medium according to claim 6, wherein a condition of Pw(max2)/Pw(min2)>1.5 is satisfied, where Pw(min2) is a lower limit of recording power provided by the laser beam when the jitter value of the recording mark formed is less than 9%, and Pw(max2) is an upper limit of recording power provided by the laser beam when the jitter value of the recording mark formed is less than 9%.

10. The optical recording medium according to claim 7, wherein a condition of Pw(max2)/Pw(min2)>1.5 is satisfied, where Pw(min2) is a lower limit of recording power provided by the laser beam when the jitter value of the recording mark formed is less than 9%, and Pw(max2) is an upper limit of recording power provided by the laser beam when the jitter value of the recording mark formed is less than 9%.

11. The optical recording medium according to claim 8, wherein a condition of Pw(max2)/Pw(min2)>1.5 is satisfied, where Pw(min2) is a lower limit of recording power provided by the laser beam when the jitter value of the recording mark formed is less than 9%, and Pw(max2) is an upper limit of recording power provided by the laser beam when the jitter value of the recording mark formed is less than 9%.

12. The optical recording medium according to claim 8, wherein a condition of Pw(max2)/Pw(min2)>1.8 is satisfied.

13. The optical recording medium according to claim 12, wherein a condition of Pw(max2)/Pw(min2)>2 is satisfied.

14. The optical recording medium according to claim 5, further including a light-transmitting layer provided on a side of incidence of the laser beam, and a dielectric layer and a heat sink layer provided between the recording layer and the light-transmitting layer.

15. The optical recording medium according to claim 6, further including a light-transmitting layer provided on a side of incidence of the laser beam, and a dielectric layer and a heat sink layer provided between the recording layer and the light-transmitting layer.

16. The optical recording medium according to claim 7, further including a light-transmitting layer provided on a side of incidence of the laser beam, and a dielectric layer and a heat sink layer provided between the recording layer and the light-transmitting layer.

17. The optical recording medium according to claim 8, further including a light-transmitting layer provided on a side of incidence of the laser beam, and a dielectric layer and a heat sink layer provided between the recording layer and the light-transmitting layer.

18. The optical recording medium according to claim 12, further including a light-transmitting layer provided on a side of incidence of the laser beam, and a dielectric layer and a heat sink layer provided between the recording layer and the light-transmitting layer.

19. The optical recording medium according to claim 13, further including a light-transmitting layer provided on a side of incidence of the laser beam, and a dielectric layer and a heat sink layer provided between the recording layer and the light-transmitting layer.

20. The optical recording medium according to claim 14, wherein the heat sink layer has a thickness of 10 to 200 nm.

21. The optical recording medium according to claim 14, wherein the heat sink layer has a thickness of 30 to 100 nm.

22. An optical recording medium, having at least a recording layer, for recording information by forming a recording mark on the recording layer with a laser beam, wherein a condition of Pw(max1)/Pw(min1)>2.2 is satisfied, with the laser beam having a wavelength of 450 nm or less and an objective lens for focusing the laser beam being designed to have a numerical aperture of 0.7 or more, where Pw(min1) is a lower limit of recording power provided by the laser beam when a jitter value of the recording mark formed is less than 13%, and Pw(max1) is an upper limit of recording power provided by the laser beam when the jitter value of the recording mark formed is less than 13%.

23. The optical recording medium according to claim 22, wherein a condition of Pw(max1)/Pw(min1)>2.2 is satisfied with the laser beam being set at a wavelength of 380 to 450 nm.

* * * * *